Jan. 17, 1928.
J. H. REEDY
PACKING BOX
Filed Feb. 6, 1925
1,656,679
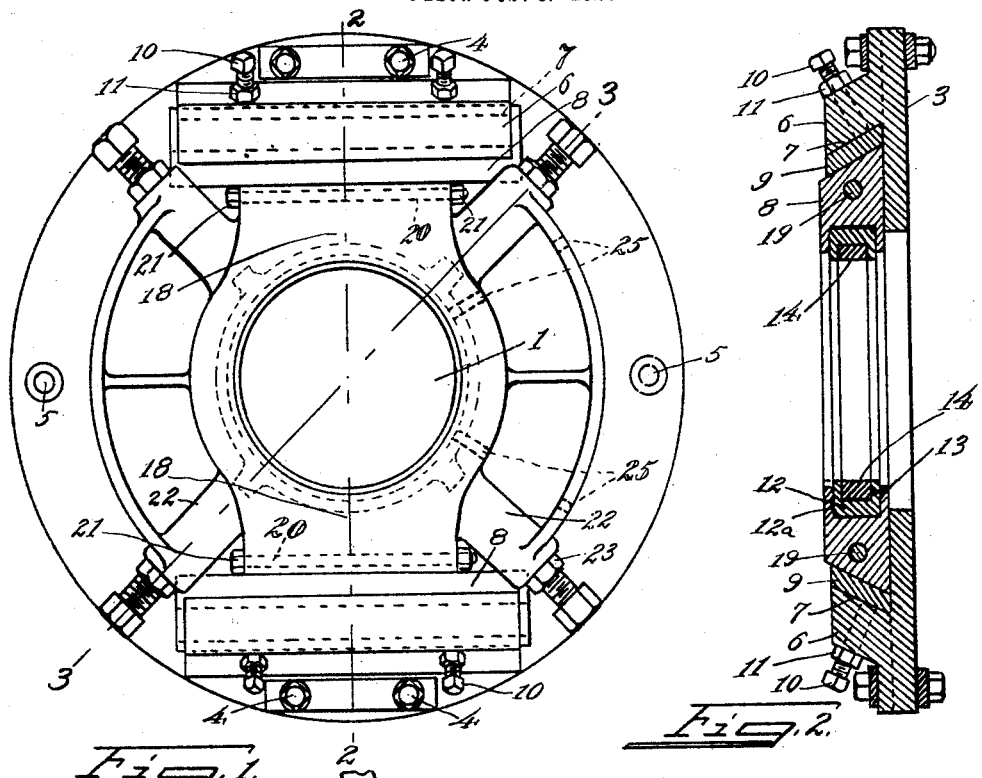
INVENTOR:
John H. Reedy
BY
Allen & Allen
ATTORNEYS.

Patented Jan. 17, 1928.

1,656,679

UNITED STATES PATENT OFFICE.

JOHN H. REEDY, OF HAMILTON, OHIO, ASSIGNOR TO THE CHAMPION COATED PAPER COMPANY, OF HAMILTON, OHIO, A CORPORATION OF OHIO.

PACKING BOX.

Application filed February 6, 1925. Serial No. 7,354.

My invention relates to packing boxes for shafts in general and more particularly for that class of packing boxes used in journaling beater and pulper shafts in paper manufacturing plants.

It is my object to provide for this purpose a packing box which will be simple in construction, easy to install and repair and which will provide bearing surfaces which will be subject to jolting or jarring movement in any direction with co-ordinate movement of all the parts of the bearing in the same direction so that leakage about the shaft through the bearing will not occur when the shaft is jolted or jarred out of position.

The beater shafts in a paper mill must be adjusted for height, notwithstanding the fact that there is liable to be a sudden jarring motion of the shaft in an upward direction caused by the beater jumping over a large obstruction. My invention is, therefore, particularly applicable to a beater shaft because the bearing on the shaft will yield to a sudden jarring impetus in any direction without causing a corresponding leak or exposure in the bearing on the opposite side. My invention therefore not only provides a simple adjustable bearing surface but it further decreases the likelihood of the beater sticking due to obstructions within the beater.

The principle involved in my construction is that of housing members adjustably mounted on a face plate and members bearing on the shaft retained in the housing member by spring tension and cushioned resistance.

Referring to the drawing forming part of this specification, Figure 1 represents a front view of the assembled packing box. Figure 2 is a section along the lines 2—2 of Figure 1. Figure 3 is a section along the lines 3—3 of Figure 1 and Figure 4 is a front view of the segmental inner bearing showing the method of spring or cushion support. Figure 5 shows a modification of the spring method of supporting the quadrant packing rings by an air cushion chamber.

The shaft generally indicated at 1 extends through the frame 2 of the machine. To the frame a face plate 3 is attached, the mounting being in the particular construction shown by means of bolts 4 interspaced and extending through holes 5 in the face plate and secured in the frame of the machine. The face plate has extended lugs 6 on it and grooves 7 on the inner side of the lugs are machined to an angle which in the particular illustration shown is about 60° from vertical. These grooves extend towards a center from the base of the face plate and support the bearing supporting plates 8. The bearing supporting plates have angularly planed sides which are slidably held in the grooves in the face plate by gibs 9. Bolts 10 extending through the exterior of the lugs bear against the gibs and are themselves held in adjusted position by means of lock nuts 11. The bearing members 12 are slidably retained in grooves 12$^a$ in the supporting plates 8, and surround the shaft. They are segmental in shape and have peripheral grooves 13 in the side facing the shaft for retaining the strips of packing 14. In the particular illustration shown these bearing members are quadrants with alternate angular sloping ends planed to fit, the front end of the one in the back end of the other, to form a complete circle or ring surrounding the shaft. Each quadrant preferably has a lug 15 extending from its outer side which forms the inner guide for a spring 16, which has a plunger 17 engaging its outer end. The supporting plates 8 which in the illustration shown are in the form of half circular plates with meeting faces 18 are held in position by means of aligned holes 19 and bolts 20 slidably retained in the holes by means of nuts 21 threaded about their ends. Each half circular portion of the bearing supporting structure 8 has lugs 22 built integrally with the plate which support bolts 23 threaded in holes drilled and threaded on lines of radius from the center of the shaft. These bolts are retained in adjusted position by means of lock nuts 24 and their inner ends bear against the plungers 17. The quadrant sections of the inner bearing rings are, therefore, held in a tensioned position which will yield under the impetus of a sudden jolt of the shaft. The angular sloping ends of these quadrant packing rings tend toward a smoother reciprocating movement of the quadrant sections not affected by a sudden jolt to move with the shaft and so prevent any leakage about it. Oil holes 25 in the slidable member 8 and the quadrant rings 12 provide a means of lubricating the quadrant packing rings.

While I have described the particular method of spring support for the quadrant packing rings which I have found most effective, I do not wish therefore to be limited to the particular method described. An alternate method which presents many possibilities particularly in use on shafts less liable to violent jars is to have the lugs 15 with piston heads 26 mounted on their ends and rings 27 forming a compression compartment in an aperture 28 in the lugs 22 on the bearing plates and adjustable by a compression nut 29 closing the aperture, making an air tight seal.

Having thus described the invention which it is my desire to secure by Letters Patent, what I claim:—

1. In a packing box for a shaft, standards for supporting the machine with the shaft therein, a face plate mounted on the standards, lugs on the face plate, said lugs having angular machined grooves, bearing supporting members slidably mounted on the face plate in the angular machined grooves with gibs and adjustment bolts for a bearing between the machined surfaces of the grooves and the bearing supporting members, and bolts for the correlative adjustable retainment of the bearing supporting members, said bearing supporting members having peripheral grooves, arcuate sections of a packing ring surrounding the shaft and mounted in the peripheral grooves, said sections being recessed to receive shaft packing, said face plate having holes for lubricating the arcuate packing ring sections and means adjustably mounted in the bearing supporting member for providing a cushioned resistance to an impetus of the shaft in any decentralized direction.

2. In a packing box for a shaft, standards for supporting the machine with the shaft therein, a face plate mounted on the standards, lugs on the face plate, said lugs having angular machined grooves, bearing supporting members slidably mounted on the face plate in the angular machined grooves with gibs and adjustment bolts for a bearing between the machined surfaces of the grooves and the bearing supporting members, and bolts for the correlative adjustable retainment of the bearing supporting members, said bearing supporting members having peripheral grooves, arcuate sections of a packing ring surrounding the shaft and mounted in the peripheral grooves, said sections being recessed to receive shaft packing, said face plate having holes for lubricating the arcuate packing ring sections and means adjustably mounted in the bearing supporting member for providing a cushioned resistance to an impetus of the shaft in any decentralized direction, and means for impelling a corresponding movement keeping all the arcuate packing ring sections in concentrically aligned position on the shaft at the time of an impetus of the shaft in any decentralized direction.

JOHN H. REEDY.